(12) United States Patent
Emde et al.

(10) Patent No.: US 11,077,836 B2
(45) Date of Patent: Aug. 3, 2021

(54) METHOD FOR CONTROLLING A HYDRAULIC BRAKING SYSTEM

(71) Applicant: Robert Bosch GmbH, Stuttgart (DE)

(72) Inventors: Christoph Emde, Leingarten (DE);
Heiko Druckenmueller, Mundelsheim (DE); Holger Kurz, Stuttgart (DE);
Patrick Schellnegger, Ludwigsburg (DE); Yakup Navruz, Heilbronn (DE);
Andreas Schmidtlein, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 13 days.

(21) Appl. No.: 16/382,979

(22) Filed: Apr. 12, 2019

(65) Prior Publication Data
US 2019/0366996 A1     Dec. 5, 2019

(30) Foreign Application Priority Data
May 30, 2018    (DE) .................... 10 2018 208 580.3

(51) Int. Cl.
*B60T 13/20*     (2006.01)
*H02P 6/17*      (2016.01)
*B60T 17/02*     (2006.01)
*B60T 13/66*     (2006.01)

(52) U.S. Cl.
CPC ............ *B60T 13/20* (2013.01); *B60T 13/662* (2013.01); *B60T 17/02* (2013.01); *H02P 6/17* (2016.02)

(58) Field of Classification Search
CPC ........ B60T 13/20; B60T 13/662; B60T 17/02; B60T 8/173; B60T 8/1755; B60T 2270/30; B60T 13/70; H02P 6/17
See application file for complete search history.

(56) References Cited

U.S. PATENT DOCUMENTS

| | | | |
|---|---|---|---|
| 2004/0183366 A1* | 9/2004 | Kamiya ................ | B60T 17/221 303/11 |
| 2005/0067890 A1* | 3/2005 | Tagome ................ | G11B 19/26 303/112 |
| 2008/0007116 A1* | 1/2008 | Takahashi ............. | B60T 7/042 303/113.3 |
| 2012/0076667 A1* | 3/2012 | Patient ................. | F04B 49/12 417/44.1 |
| 2013/0026818 A1* | 1/2013 | Schmidt ............... | B60T 8/4059 303/139 |
| 2015/0061366 A1* | 3/2015 | Shimada .............. | B60T 13/146 303/15 |
| 2015/0229247 A1* | 8/2015 | Nakai .................. | H02P 29/50 318/400.02 |
| 2018/0113069 A1* | 4/2018 | Oho .................... | G01N 21/211 |
| 2018/0119800 A1* | 5/2018 | Shimizu ............... | B60W 20/00 |
| 2018/0354484 A1* | 12/2018 | Yamamoto ........... | B60T 13/686 |

* cited by examiner

*Primary Examiner* — Vishal R Sahni

(74) *Attorney, Agent, or Firm* — Maginot, Moore & Beck LLP

(57) ABSTRACT

In a method for controlling a hydraulic braking system, wherein the braking system includes a hydraulic pump that is driven by an electric motor so as to generate a volume of fluid flow for the hydraulic braking system. the electric motor is controlled in such a manner that fluid pulsation in the hydraulic braking system is counteracted by means of modulating a rotational speed of the electric motor. The modulation is generated by means of the control procedure. Furthermore, a device is designed and configured so as to perform the method.

9 Claims, 3 Drawing Sheets

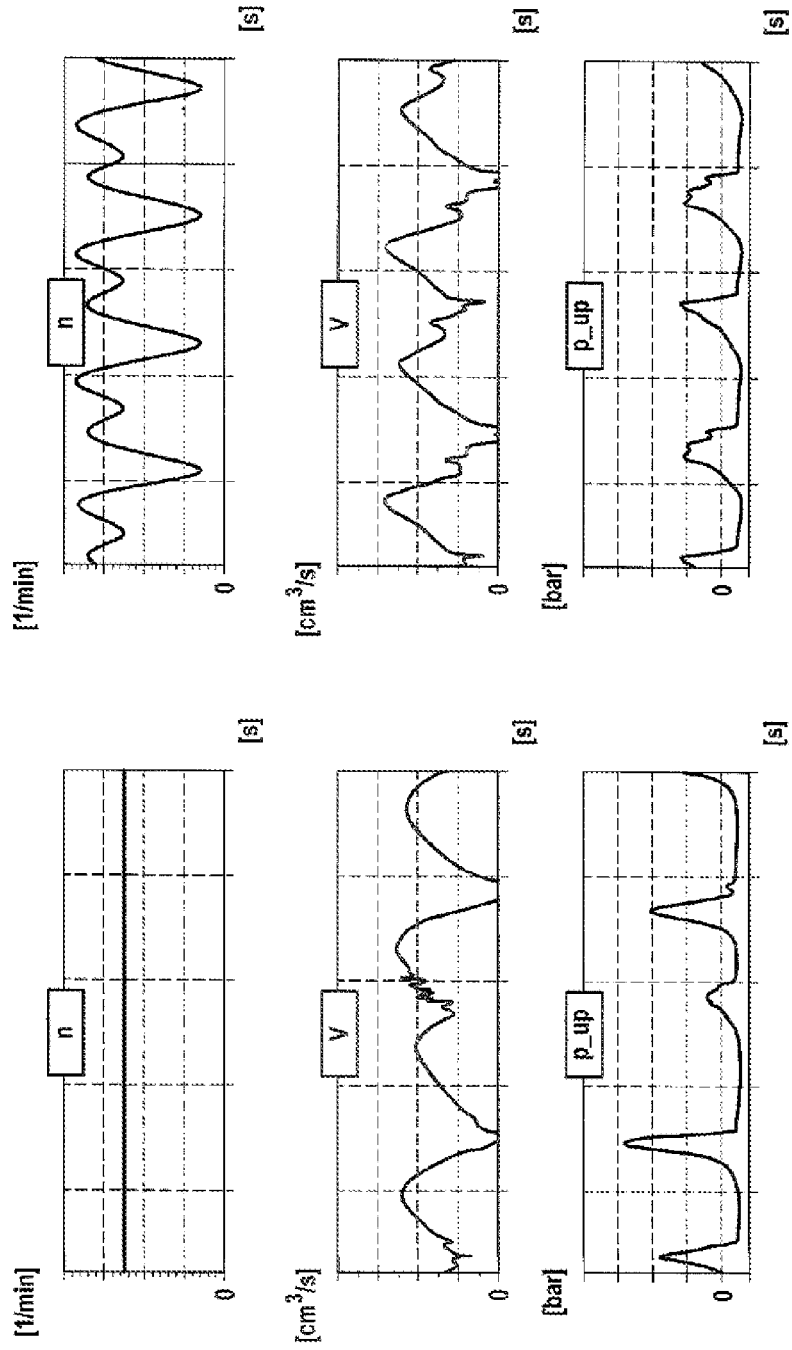

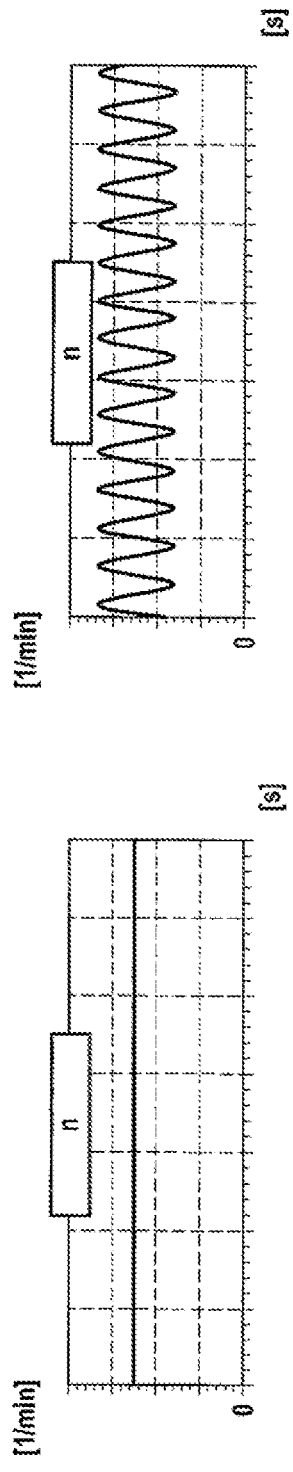
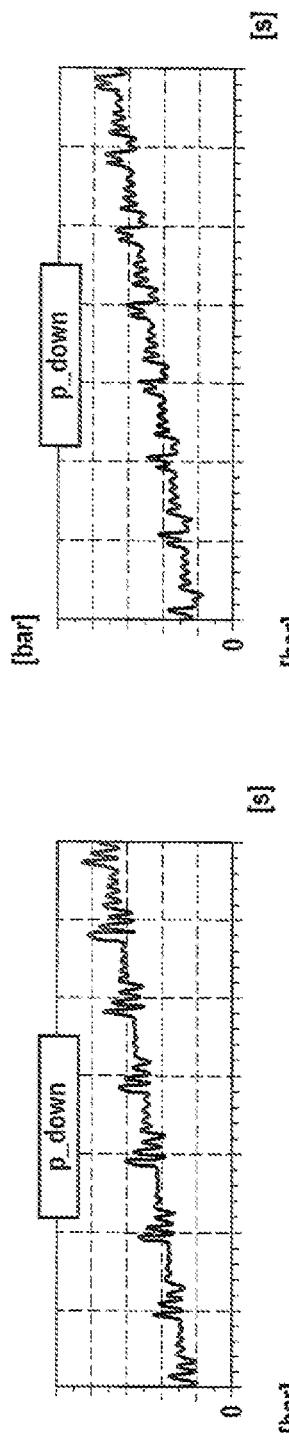
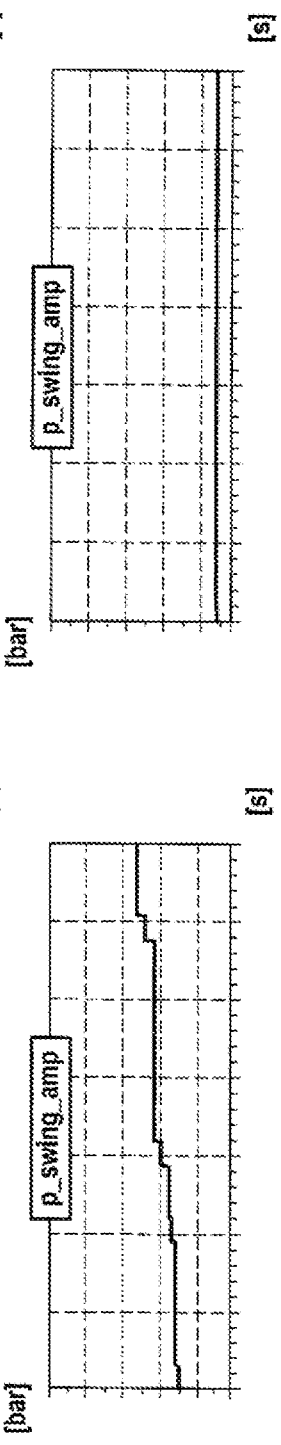
Fig. 3a
Fig. 3b

METHOD FOR CONTROLLING A HYDRAULIC BRAKING SYSTEM

This application claims priority under 35 U.S.C. § 119 to patent application no. DE 10 2018 208 580.3, filed on May 30, 2018 in Germany, the disclosure of which is incorporated herein by reference in its entirety.

The present disclosure relates to a method for controlling a hydraulic braking system, wherein the braking system comprises a hydraulic pump that is driven by an electric motor so as to generate a volume of fluid flow for the hydraulic braking system. The method is characterized in that the electric motor is controlled in such a manner that fluid pulsation in the hydraulic braking system is counteracted by means of modulating a rotational speed of the electric motor, said modulation being generated by means of the control procedure. Furthermore, the disclosure relates to a device that is designed and configured so as to perform the method.

BACKGROUND

Driver assist systems such as ESP require a pressure supply unit so as to actively engage in the pressure modulation procedure of the wheel brake calipers. The type of construction used most frequently is the radial piston pump in combination with an eccentric that is drive by an electric motor. During the operation at a constant rotational speed, intake phases and delivery phases of the pump change periodically, wherein the volume flow in the ideal case progresses in each phase in a sinusoidal manner. However, in the real operation, these progressions are still influenced by the behavior of the inlet and outlet valves. Furthermore, the rotational speed of DC motors is likewise subject to fluctuations on account of the fluctuating load torque, which influences the volume flow progression. In addition to the pulsations caused by the sinusoidal progression, pressure peaks occur on the intake side as a result of air-outgassing effects, whereas on the pressure side high frequency pulsations are caused by the pump outlet valve ("pump rattling"). The pulsations are transmitted via structural vibrations of the hydraulic lines in the vehicle inner compartment and are perceived by the driver as disturbing noises. It follows from this that there is a NVH problem (noise-vibration-harshness). In order to reduce high frequency pulsations, low-pass filter components (series connection of a capacitance and a restrictor) maybe installed but this involves costs.

SUMMARY

In contrast to this, the method in accordance with the disclosure and also the device render it advantageously possible to improve the NVH whilst reducing costs.

This is rendered possible in accordance with the disclosure by means of the features disclosed herein.

The method in accordance with the disclosure for controlling a hydraulic braking system, wherein the braking system comprises a hydraulic pump that is driven by an electric motor so as to generate a volume of fluid flow for the hydraulic braking system is characterized in that the electric motor is controlled in such a manner that fluid pulsation in the hydraulic braking system is counteracted by means of modulating a rotational speed of the electric motor, said modulation being generated by means of the control procedure.

This is understood to mean that the electric motor is controlled in such a manner that a rotational speed of the electric motor is subjected to a defined modulation, wherein the modulation is configured in such a manner that as consequence fluid pulsation in the hydraulic braking system is reduced. In general, the number of rotations per time unit is understood to be the rotational speed. Accordingly, the change in the rotational speed over time or also with respect to the rotor position, etc is understood to be the modulation of a rotational speed. This corresponds therefore to the definition of a specific rotational speed progression. It is possible to achieve this by means of varying the angular frequency. By way of example, the procedure of controlling an ESP system or controlling another driver assist system may be understood to mean controlling a hydraulic braking system. Such a system comprises generally at least one solenoid valve for controlling a volume of fluid flow from the hydraulic pump to a wheel brake.

The fluid pulsation is counteracted by virtue of the fact that the pressure fluctuations and/or the volume fluctuations in the braking system are reduced. The fluid pulsations are smoothed. By way of example, optimization is achieved by virtue of avoiding or reducing the pulsations by means of a sinusoidal progression of the volume flow in the case of a radial piston pump having an eccentric. As an alternative or in addition thereto, the optimization resides in a reduction of the pressure peaks which occur on account of the air outgassing effects on the intake side. As an alternative or in addition thereto, the optimization is achieved by means of a reduction of high frequency pulsations, which is generated by means of a pump outlet valve on the pressure side, in other words in reducing the extent to which the pressure oscillates (also referred to as pressure oscillation amplitude). In particular, an optimized control of a brushless DC motor is provided (BLDC, brushless-DC-motor).

Pressure pulsations are advantageously avoided or at least reduced by means of a control procedure of this type. Disturbing noises are hereby avoided or at least reduced. In general, this consequently leads to an improvement of the NVH behavior (noise vibration harshness). The method effectively avoids or reduces pulsations directly as they occur. It is therefore as a consequence possible to combat such pulsations in a very effective and efficient manner. Furthermore, the novel control procedure results in a cost reduction since it is possible to forego further physical damping measures in the hydraulic braking system.

In an advantageous embodiment, the method is characterized in that the rotational speed of the electric motor is modulated during one rotation.

This is understood to mean that the rotational speed of the electric motor is modulated during one rotation of the rotor of the electric motor in such a manner that fluid pulsation in the hydraulic braking system is counteracted. In other words, the rotational speed progression is varied during one rotation in order to reduce fluid pulsations. It is naturally also possible to vary the rotational speed during multiple rotations or during a portion of one rotation. By way of example, the rotational speed is varied during a half-rotation (in a sinusoidal manner).

In one possible embodiment, the method is characterized in that the rotational speed of the electric motor is modulated in dependence upon a rotor position.

This is understood to mean that the rotational speed of the electric motor is modulated in dependence upon a rotor position in such a manner that fluid pulsation in the hydraulic braking system is counteracted. By way of example, a first rotational speed is set in a first rotor position and a second rotational speed is set in a second rotor position, said second rotational speed being different from the first rotational speed. In principle, it is possible to set the suitable rotational speed at each rotor position. An implementation of this type corresponds to the definition of a rotational speed profile over the angular position of the rotor or rather of a rotational speed progression over the time period of one rotation. A rotor position sensor is advantageously used and evaluated for this purpose. Based on the rotor position that is determined in this manner, it is possible to define and apply a suitable control current strength for the electric motor.

In one preferred embodiment, the method is characterized in that the rotational speed of the electric motor is modulated periodically.

This is understood to mean that the rotational speed of the electric motor is varied in regular intervals with by way of example a repeating pattern. This variation (modulation) is performed accordingly so as to reduce or avoid the fluid pulsations. By way of example, it is possible for this purpose in the case of a radial piston pump having two pistons to vary the rotational speed in a sinusoidal manner. In other words, the rotational speed progression is ideally tailored to suit the existing pump structure. On account of the pump structure having two structurally identical pistons, the rotational speed progression for the intake phase and the delivery phase for both pumps is identical and it is therefore possible to set it uniformly for both pistons. On account of the pump structure having two opposite lying pistons, the ideal rotational speed progression furthermore repeats every 180° angle of rotation of the rotor.

In an alternative further development, the method is characterized in that the rotational speed of the electric motor is modulated by taking into consideration an approach using Fourier modes.

This is understood to mean that an approach using Fourier modes whereby its basic frequency corresponds in particular to half a motor rotation is selected for the periodic modulation of the motor rotation speed.

In one advantageous embodiment, the method is characterized in that the rotational speed of the electric motor is modulated by taking into consideration the following approach:

$$n = n_0 + 60 \sum_{i=1}^{5} a_i \sin(i\omega_0 t + \varphi_i) \quad [1/\text{min}] \text{ wherein}$$

$$\omega_0 = 4\pi \frac{n_0}{60} \quad [\text{Hz}]$$

This describes an approach using Fourier modes whereby its basic frequency corresponds in particular to half a motor rotation. The following applies in this case: n=(rotational speed at a point in time t), $n_0$=(basic rotational speed), $a_i$=(Fourier coefficient_1), $\phi_i$=(Fourier coefficient_2), i=(progression index), ω=(basic frequency), t=(time).

In one possible embodiment, the method is characterized in that the coefficients $a_i$ and $\phi_i$ are determined by means of simulation and/or the coefficients $a_i$ and $\phi_i$ are determined by means of experiment.

In a preferred further development, the method is characterized in that the control procedure is configured as a control procedure of a brushless DC motor.

This is understood to mean that the method provides and configures the optimized control procedure of a brushless DC motor (BLDC brushless DC motor) so as by means of modulating a rotational speed of the brushless DC motor to counteract fluid pulsation in the hydraulic braking system, said modulating procedure being generated by means of the control procedure.

In an alternative embodiment, the method is characterized in that the method comprises at least one of the following steps:
determining a rotor position of the electric motor,
determining a positon of an outlet valve,
definition of a desired rotational speed of the electric motor so as to counteract fluid pulsation in the hydraulic braking system,
controlling the electric motor so as to set the desired rotational speed.

In this case, the rotor position of the electric motor is advantageously determined for defining the position of the pump. It is possible to derive from the rotor position and known structure precisely the situation in which the pump is actually located and which characteristic feature is to be expected currently and in the next position. The definition of the desired rotational speed is understood to be the determination of a suitable rotational speed so as to counteract fluid pulsation. This determination may be performed by way of example using a Fourier approach. In this case, it is possible to refer to values that are stored in a database and that are defined by way of example on the basis of simulation and/or experiments.

This method may be performed by way of example using software or hardware or a mixture of software and hardware by way of example in a control unit.

Moreover, the approach presented here provides a device that is configured so as to perform, control or implement in corresponding devices the steps of a variant of a method presented here. It is also possible by means of these embodiment variants of the disclosure in the form of a device to rapidly and efficiently achieve the object that forms the basis of the disclosure.

The term device may be understood in this case to be an electrical unit that processes sensor signals and in dependence thereupon outputs control and/or data signals. The device may comprise an interface that may be configured as hardware and/or software. In the case of a hardware configuration, the interfaces may be by way of example part of a so-called system ASIC that includes the diverse functions of the device. However, it is also possible that the interfaces are dedicated, integrated switching circuits or comprise at least in part discrete components. In the case of a software configuration, the interfaces may be software modules that are provided by way of example on a microcontroller in addition to other software modules.

Also of advantage is a computer program product or computer program having a program code that may be stored on a machine-readable carrier or storage medium, such as a semiconductor storage device, a hard drive storage device or an optical storage device and is used for performing, implement and/or controlling the steps of the method according to any one of the embodiments described above, in particular if the program product or program is performed on a computer or a device.

The term device may in this case also be understood to be a brushless DC motor for driving a pump of a hydraulic braking system, wherein the DC motor comprises a rotor position sensor. The term device is moreover to be understood to be a hydraulic braking system that is configured so as to perform the method described, wherein the braking system does not comprise a hydraulic damping component so as to counteract fluid pulsation in the hydraulic braking system, in particular it does not comprise a hydraulic low-pass filter. The hydraulic low-pass filter is understood to be in particular a series connection of a hydraulic capacitance and hydraulic resistance (restrictor).

BRIEF DESCRIPTION OF THE DRAWINGS

It is to be noted that the features that are mentioned individually in the description may be combined with one another in any technically expedient manner and demonstrate further embodiments of the disclosure. Further features and expediency of the disclosure are disclosed in the description of exemplary embodiments with the aid of the attached figures.

In the figures:

FIG. 2a illustrates the progression of specific variables of a hydraulic braking system, FIG. 2b illustrates the progression of specific variables of a hydraulic braking system in the case of a first embodiment of the disclosure, FIG. 3a illustrates the progression of specific variables of a hydraulic braking system, FIG. 3b illustrates the progression of specific variables of a hydraulic braking system in the case of a further embodiment of the disclosure.

DETAILED DESCRIPTION

Figure 1:
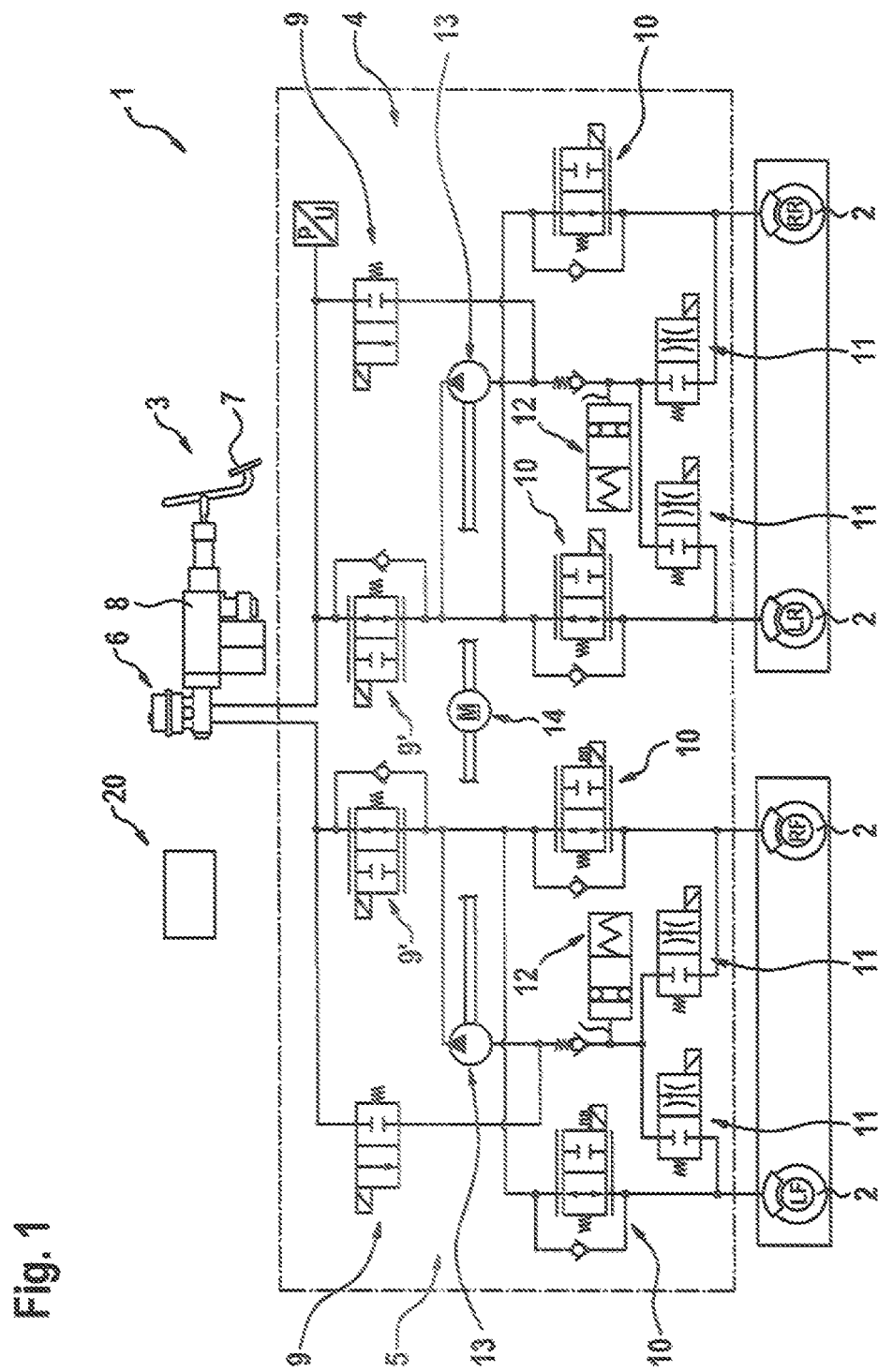
FIG. 1 illustrates a braking system of a motor vehicle in a simplified view.

FIG. 1 illustrates in a simplified view a braking system 1 for a motor vehicle that is not illustrated in detail. The braking system 1 comprises multiple wheel brakes 2 that may be actuated by a driver of the motor vehicle by means of a brake pedal unit 3 as operational brakes. The wheel brakes 2 are identified in this case by LR, RF, LF and RR, whereby their position or rather allocation on the motor vehicle is explained, wherein LR represents left rear, RF represents right front, LF represents left front and RR represents right rear. Two brake circuits 4 and 5 are formed between the brake pedal unit 3 and the wheel brakes 2, wherein the brake circuit 4 is allocated to the wheel brakes LF and RR and the brake circuit 5 is allocated to the wheel brakes LR and RF. The two brake circuits 4 and 5 are constructed in an identical manner with the result that the construction of the two brake circuits 4, 5 is to be explained in detail below with reference to the brake circuit 4.

The brake circuit 4 is connected in the first instance to a master brake cylinder 6 of the brake pedal unit 3, wherein the brake pedal unit 3 also comprises a brake pedal 7 that may be actuated by the driver and also a braking force booster 8. The braking force booster may be actuated by way of example in a pneumatic or electromechanical manner. The brake circuit 4 comprises a switching valve 9' and also a high pressure switching valve 9 that are connected to one another in parallel and follow the master brake cylinder 6. The switching valve 9' is normally open and allows the hydraulic medium of the brake circuit, in other words the brake fluid, to flow in both directions. The high pressure switching valve 9 is normally closed and in the energized state allows the brake fluid to flow through only in the direction toward the wheel brakes 2. The switching valve 9' is furthermore connected to the two wheel brakes 2 by interconnecting in each case an inlet valve 10 that is normally open in both directions. Furthermore, an outlet valve 11 that is normally closed is allocated to the wheel brakes 2 of the brake circuit 4. A hydraulic pressure storage device 12 is connected downstream of the outlet valves 11. The outlet valves 11 are furthermore connected on the outlet side to an intake side of a pump 13 that is connected on the pressure side between the switching valve 9' and the inlet valves 10 to the brake circuit 4. The pump 13 is mechanically connected to an electric motor 14. It is provided that the electric motor 14 is allocated to the pumps 13 of both brake circuits 4 and 5. Alternatively, it is also possible to provide that each brake circuit 4, 5 comprises a dedicated electric motor 14. A control device 20 controls both the electric motor 14 and also the valves 9, 9', 10, 11.

If the two switching valves 9' of the brake circuits 4, 5 are closed, then the hydraulic pressure in the downstream section of the brake circuits 4, 5, in other words between the switching valves and the wheel brakes 2, is trapped or rather maintained, even if the driver releases the brake pedal 7.

FIG. 2a illustrates the progression of specific variables of a hydraulic braking system in accordance with the prior art. The top figure illustrates a rotation speed n over time. This progresses in an essentially constant manner. The middle figure illustrates the volume flow V that is set thereby. The bottom figure illustrates the pressure upstream of the pump p_up (pressure upstream) is illustrated in the bottom figure. It is clear to see in this case the high pressure peaks of the second peak.

FIG. 2b illustrates the progression of specific variables of a hydraulic braking system in the case of a first embodiment of the disclosure. In this case, for ease of comparison, the identical variables to those of FIG. 2a are illustrated. The modulation of the rotational speed over time is clearly distinguishable in the top figure. In this case, it is even possible to also observe the periodic pattern of the rotational speed progression, said pattern being defined in this embodiment and repeated at intervals of approx. 0.02 seconds—this corresponds by way of example to half a rotation of the motor shaft. Based thereon, a slightly changed volume flow V is set, which is illustrated in the middle figure. In turn, it is clearly discernible in the bottom figure that the pressure peaks of the pressure p_up are reduced.

FIG. 3a illustrates in turn the progression of specific variables of a hydraulic braking system in accordance with the prior art. A rotational speed n over time is illustrated in the top figure. This progresses in an essential constant manner. The pressure downstream of the pump p_down (pressure downstream) is illustrated in the middle figure. The pressure oscillation range p_swing_amp at the pump outlet (also referred to as pressure oscillation amplitude) is illustrated in the bottom figure. FIG. 3b illustrates the progression of identical variables of a hydraulic braking system in the case of a second embodiment of the disclosure. It is clear to see, in turn, the modulated rotational speed of the electric motor. The pressure progression downstream of the pump p_down in the middle figure illustrates a slightly changed progression. In turn, the reduced and uniformly distribution of the pressure oscillation range p_swing_amp is clearly discernible in the bottom figure.

It is to be noted that the scale of the X-axes and Y-axes is identical in the respective illustrations (a=prior art, b=embodiments of the disclosure). As a result, the differences can be determined easily.

The invention claimed is:

1. A method for controlling a hydraulic braking system comprising:
   controlling an electric motor, which drives a hydraulic pump so as to generate a volume of flow in the hydraulic braking system, in such a manner that fluid pulsation in the hydraulic braking system is counteracted by modulating a rotational speed of the electric motor in a sinusoidal manner, said modulation being generated by a control procedure.

2. The method according to claim 1, wherein the rotational speed of the electric motor is modulated during one rotation.

3. The method according to claim 1, wherein the rotational speed of the electric motor is modulated in dependence upon a rotor position.

4. The method according to claim 1, wherein the rotational speed of the electric motor is modulated by taking into consideration an approach using Fourier modes.

5. The method according to claim 1, wherein the control procedure is configured as a control procedure of a brushless DC motor.

6. The method according to claim 1, further comprising at least one of:
- determining a rotor position of the electric motor;
- determining a position of an outlet valve;
- defining a desired rotational speed of the electric motor so as to counteract fluid pulsation in the hydraulic braking system; and
- controlling the electric motor so as to set the desired rotational speed.

7. A control unit configured to execute program instructions stored in a non-transitory memory to:
control an electric motor, which drives a hydraulic pump so as to generate a volume of flow in a hydraulic braking system, in such a manner that fluid pulsation in the hydraulic braking system is counteracted by modulating a rotational speed of the electric motor in a sinusoidal manner, said modulation being generated by a control procedure.

8. A hydraulic braking system comprising:
an electric motor;
a hydraulic pump driven by the electric motor so as to generate a volume of flow in the hydraulic braking system; and
a control unit that is configured to control the electric motor in such a manner that fluid pulsation in the hydraulic braking system is counteracted by modulating a rotational speed of the electric motor in a sinusoidal manner, said modulation being generated by a control procedure,
wherein the braking system does not comprise a hydraulic damping component configured to counteract fluid pulsation in the hydraulic braking system.

9. The hydraulic braking system of claim 8, wherein the braking system does not include a hydraulic low-pass filter configured to counteract the fluid pulsation in the hydraulic braking system.

* * * * *